United States Patent [19]

Weimer et al.

[11] Patent Number: 5,830,312
[45] Date of Patent: Nov. 3, 1998

[54] BUTT FUSION APPARATUS WITH CLAMPING JAWS FOR CLAMPING PIPE TO BE FUSED WITHOUT INTERFERENCE BETWEEN THE CLAMPS AND THE PIPE

[75] Inventors: James Callen Weimer, Charleston; Jack Lee Workman, Alum Creek; Gary Wayne Gunno, Charleston, all of W. Va.

[73] Assignee: Hughes Supply, Inc., Orlando, Fla.

[21] Appl. No.: 593,161

[22] Filed: Feb. 1, 1996

Related U.S. Application Data

[63] Continuation-in-part of Ser. No. 551,119, Oct. 31, 1995.
[51] Int. Cl.$^6$ .............................. B32B 1/08; B29C 65/18
[52] U.S. Cl. ..................... 156/503; 156/158; 156/304.2; 156/304.6; 269/43; 29/272
[58] Field of Search ............................. 156/158, 304.2, 156/304.6, 499, 503; 269/43; 29/272, 281.5; 228/44.5, 49.3

[56] References Cited

U.S. PATENT DOCUMENTS

| | | |
|---|---|---|
| 3,400,030 | 9/1968 | Burger . |
| 3,729,360 | 4/1973 | McElroy . |
| 3,846,208 | 11/1974 | McElroy . |
| 4,071,395 | 1/1978 | McElroy . |
| 4,263,084 | 4/1981 | Takala . |
| 4,310,376 | 1/1982 | Ebina et al. . |
| 4,345,956 | 8/1982 | Cox et al. . |
| 4,352,708 | 10/1982 | McElroy . |
| 4,484,975 | 11/1984 | McElroy . |
| 4,533,424 | 8/1985 | McElroy . |
| 4,957,570 | 9/1990 | Jenkins et al. . |
| 5,013,376 | 5/1991 | McElroy, II et al. . |
| 5,078,827 | 1/1992 | Calderwood . |
| 5,124,533 | 6/1992 | Dommer et al. . |

FOREIGN PATENT DOCUMENTS

| | | | |
|---|---|---|---|
| 338401 | 5/1972 | U.S.S.R. | ............................. 156/304.2 |
| 740513 | 6/1980 | U.S.S.R. | ............................... 156/556 |

OTHER PUBLICATIONS

Christie Manufacturing Inc.; Polyethylene Pipe Butt Fusion Machines; p. 1; (No date listed); Frisco, TX.
Christie Manufacturing Inc.; Model 810 Butt Fusion Machine; pp. 1 & 2; (No date listed); Frisco, TX.
Christie Manufacturing Inc.; Model 1410 Butt Fusion Machine; pp. 1 & 2; (No date listed); Frisco, TX.
Christie Manufacturing Inc.; Model 1810 Butt Fusion Machine; pp. 1 & 2; (No date listed); Frisco, TX.
Christie Manufacturing Inc.; Model 2410 Butt Fusion Machine; pp. 1 & 2; (No date listed); Frisco, TX.

*Primary Examiner*—Michael W. Ball
*Assistant Examiner*—Sam Chuan Yao
*Attorney, Agent, or Firm*—Adams Law Firm, P.A.

[57] ABSTRACT

An apparatus for attaching abutting ends of first and second coaxial pipe sections together includes a support frame, at least two spaced-part fixed pipe clamping jaws having respective upper and lower jaw halves carried by the support frame for positioning the first pipe section in a fixed position, at least two movable pipe clamping jaws having respective upper and lower jaw halves carried by the support frame for translating movement of the second pipe section relative to the fixed clamping jaws and into aligned abutment with the first pipe section, and a joining device for joining the first and second abutted pipe sections together without interference between the clamping jaws and the pipe sections. The clamping jaw pivots respective fixed and movable upper and lower jaw halves into and out of clamping engagement with the first and second coaxial pipe sections. Fixed jaw pivot pins define a pivot axis of the upper jaw half of each of the at least two fixed clamping jaws and respective movable jaw pivot pins defining a pivot axis of the upper jaw half of each of the at least two movable clamping jaws. The pivot axes of the movable jaw pivot pins and the pivot axes of the fixed pivot pins are coincident with each other, and the movable jaws and fixed jaws translates along a translation axis towards and away from each other wherein the translation axis is coincident with the pivot axis of the pivot axis of each of the fixed upper jaw halves and the movable upper jaw halves.

5 Claims, 13 Drawing Sheets

BUTT FUSION APPARATUS WITH CLAMPING JAWS FOR CLAMPING PIPE TO BE FUSED WITHOUT INTERFERENCE BETWEEN THE CLAMPS AND THE PIPE

This application is a continuation-in-part of application Ser. No. 08/551,119 filed on Oct. 31, 1995.

TECHNICAL FIELD AND BACKGROUND OF THE INVENTION

This invention relates to a butt fusion apparatus for joining fabricated or molded thermally-joinable pipe fittings to a thermally joinable pipe. The invention disclosed in this application relates to a means for opening and closing a pipe clamping jaw on a pipe clamping machine with a truly circular clamping action while eliminating jaw tangent interference with the pipe being clamped. The apparatus is adaptable to pipes having a wide range of diameters. The example disclosed in this application has jaws capable of accommodating pipe up to 60 inches (153 cm) in diameter.

Since the pipe sections and fittings are coaxially-aligned and joined at abutting peripheral end edge surfaces, these machines are referred to as "butt fusion" machines.

The rapidly expanding use of plastic pipe to form pipelines in the industrial, commercial and municipal industries has given rise to a need to refine and improve prior art thermal joining procedures. These improved procedures reduce the amount of pipe misalignment and other joining parameters to provide acceptable thermally fused joint on adjacent prepared pipe ends.

Current clamping jaws utilize a hinge located on a horizontal line above the longitudinal axis of the pipe pieces to be joined. While this hinge location can provide acceptable joints, it is generally more difficult to do so. For this reason, there is an increased risk of defective joints. The location of existing clamping jaw hinge parts increases the difficulty in providing a near round pipe joint, due to closing interference between the true jaw and the pipe wall and the geometry of the hinge.

The present invention overcomes these prior art difficulties by providing near circular clamping action and zero or near zero jaw closing interference for clamping pipe and pipe fittings. The pipe clamping jaw part is rotated into its clamping position without interfering with the surface of the part to be clamped. At the same time, the jaw provides nearly full circumferential contact with the clamped pipe or pipe fitting.

This is achieved by geometric location of the center of rotation of the hinge on a common line which divides both the clamping jaw rotating and fixed parts and the pipe into equal parts. The rotating center may also lie on a line which is parallel to and in close proximity of any such line dividing the pipe and clamping jaw into equal parts. The rotating hinge center also serves as the axis of translation of the translating jaw assembly which moves parallel to the longitudinal axis of the pipe being clamped.

By providing a rotational axis for the clamping jaw on a common line with the translating axis, distortion of the pipe from its fully rounded profile is substantially minimized.

SUMMARY OF THE INVENTION

Therefore, it is an object of the invention to provide a butt fusion machine which has a pivotable jaw which permits near circular clamping action.

It is another object of the invention to provide a butt fusion machine which includes means for zero or near zero jaw closing interference for clamping pipe and pipe fittings.

These and other objects of the present invention are achieved in the preferred embodiments disclosed below by providing in an apparatus for attaching abutting ends of first and second coaxial pipe sections together. The apparatus includes a support frame, a fixed pipe clamping jaw having upper and lower jaw halves carried by the support frame for positioning the first pipe section in a fixed position, a movable pipe clamping jaw having upper and lower jaw halves carried by the support frame for translating movement of the second pipe section relative to the fixed clamping jaw and into aligned abutment with the first pipe section, and joining means for joining the first and second abutted pipe sections together without interference between the clamping jaws and the pipe sections. The improvement comprises clamping jaw pivot means for pivoting the respective fixed and movable upper and lower jaw halves into and out of clamping engagement with the first and second coaxial pipe sections. The jaw pivot means comprises a fixed jaw pivot pin defining a pivot axis of the upper jaw half of the fixed clamping jaw and a movable jaw pivot pin defining a pivot axis of the upper jaw half of the movable clamping jaw. The pivot axis of the movable jaw pivot pin and the pivot axis of the fixed pivot pin are coincident with each other, and jaw mounting means mount the movable jaw and the fixed jaw for translating movement along a translation axis towards and away from each other wherein the translation axis is coincident with the pivot axis of the fixed upper jaw half and the movable upper jaw half.

According to another preferred embodiment of the invention, an apparatus is provided for attaching abutting ends of first and second coaxial pipe sections together. The apparatus includes a support frame, at least two spaced-part fixed pipe clamping jaws having respective upper and lower jaw halves carried by the support frame for positioning the first pipe section in a fixed position, at least two movable pipe clamping jaws having respective upper and lower jaw halves carried by the support frame for translating movement of the second pipe section relative to the fixed clamping jaws and into aligned abutment with the first pipe section, and joining means for joining the first and second abutted pipe sections together without interference between the clamping jaws and the pipe sections. The improvement comprises clamping jaw pivot means for pivoting the respective fixed and movable upper and lower jaw halves into and out of clamping engagement with the first and second coaxial pipe sections. The jaw pivot means comprises respective fixed jaw pivot pins defining a pivot axis of the upper jaw half of each of the at least two fixed clamping jaws and respective movable jaw pivot pins defining a pivot axis of the upper jaw half of each of the at least two movable clamping jaws. The pivot axes of the movable jaw pivot pins lie on a line which is coincident with a line on which the pivot axes of the fixed jaw pivot pins lie. The pivot axes and jaw mounting means mount the movable jaws and the fixed jaws for translating movement along a translation axis towards and away from each other wherein the translation axis is coincident with the pivot axis of each of the fixed upper jaw halves and the movable upper jaw halves.

Preferably, the pivot axes of the upper jaw halves and the translation axis of the jaws are exactly coincident.

Alternatively, a notional line extending through the pivot axis of the upper jaw halves and the translation axis of the jaws deviates from the horizontal centerline of the pipe sections by a distance equal to 5% or less of the diameter of the pipe.

According to yet another preferred embodiment of the invention, the apparatus is adapted to thermally fuse plastic pipe and pipe fittings.

3

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description

Figure 1:
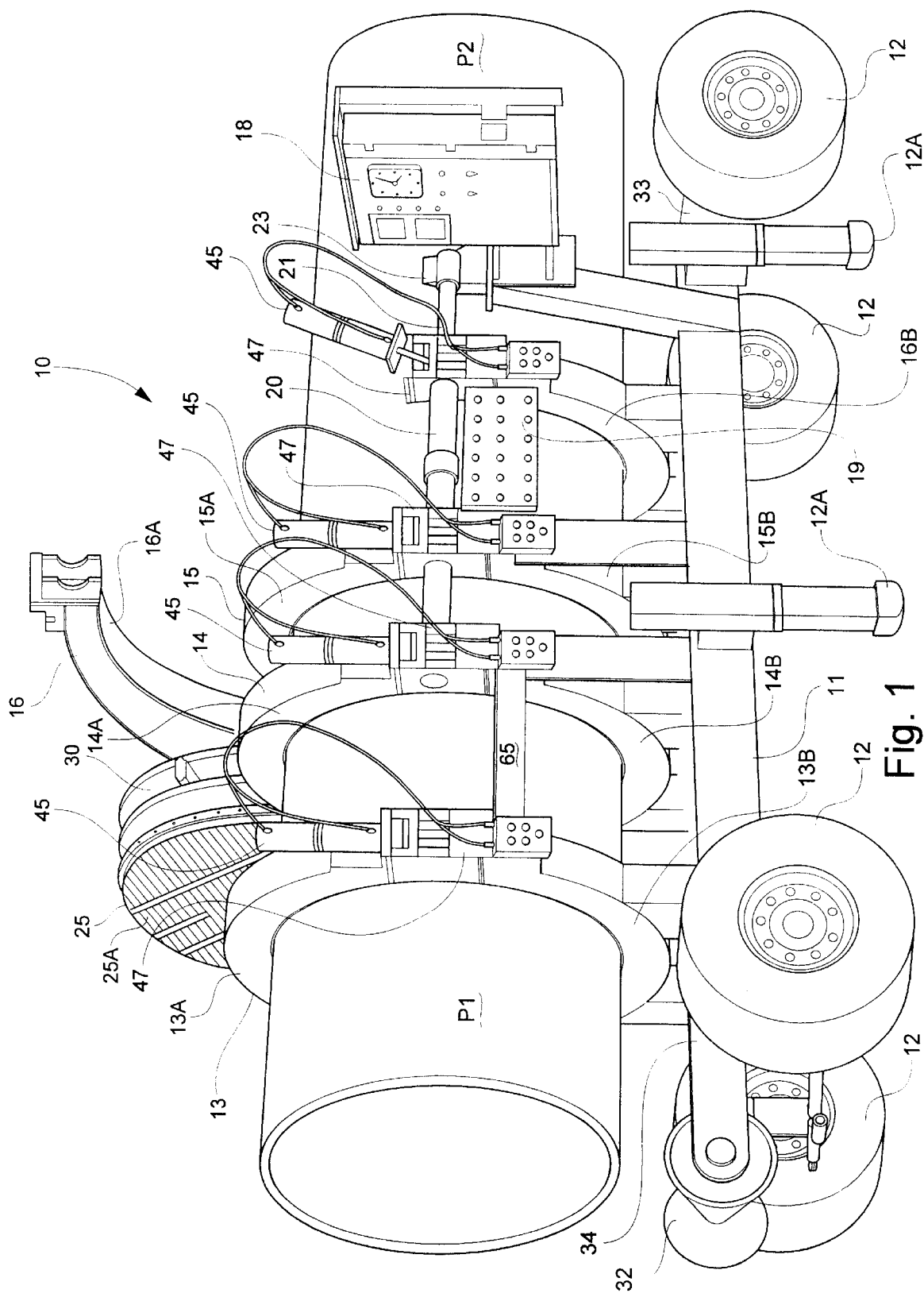
FIG. 1 is a perspective view of the butt fusion machine according to a preferred embodiment of the invention.

Referring now specifically to the drawings, a butt fusion machine according to the present invention is illustrated in FIG. 1 and shown generally at reference numeral 10. The butt fusion machine 10 may be fixed or mobile. The butt fusion machine 10 shown in FIG. 1 is a mobile unit, and includes a support frame 11, mounted on four wheels 12 which allow the butt fusion machine 10 to be towed from job site to job site and to be self-propelled on the job site as the pipeline is assembled.

Hydraulic jacks 12A located on both sides of the frame 11 permit the butt fusion machine 10 to be precisely positioned and stabilized to receive and support the pipe to be fused in the proper alignment.

Four pipe clamping jaws 13, 14, 15 and 16 are mounted and carried in spaced-apart relation on the support frame 11. Jaws 13 and 14 are fixed in relation to jaws 15 and 16, which are movable and translate along a longitudinal translation axis of the butt fusion machine 10 by the action of the guide rods 21 and cylinders 20.

Each of the jaws 13–16 are formed of upper and lower halves 13A,13B, 14A,14B, 15A,15B and 16A,16B hinged to each other, as described in further detail below, so that they may be opened for placing pipe sections in, and removing pipe sections from, the jaws 13–16.

The jaw mounting means includes longitudinally extending support guide rods 21 and cylinders 20, which are positioned on opposite, lateral sides of the jaws 15 and 16 and extend forward to jaw 14, so that the pivot axis of all of the jaws 13–16 are coincident. Rods 21 are vertically supported at one end by fixed jaw 14 and on the other end by a rear cylinder support assembly 23.

A heating assembly 25 is provided on the machine for heating the ends of pipe sections "P1" and "P2" prior to joining. A facing tool 30 squares the pipe ends before joining. Both the heating assembly 25 and facing tool 30 are pivotally-mounted on one side of the support frame 11 and are moved about a radially-offset pivot axis into and out of a position between the ends of the pipe sections "P1" and "P2" to be fused. The facing tool 30 is a disc-shaped cutter having a pair of radially-extending cutter blades on opposite sides of the tool. Rotation of the cutter blades allows abutting ends of the pipe sections "P1" and "P2" to be trimmed into parallel alignment in order to achieve an exact, even fusion. After facing the pipe sections "P1" and "P2", the facing tool 30 is retracted and the heating assembly 25 is rotated into position.

Opposing non-stick radial surfaces 25A and 25B of the heating assembly evenly heat the opposed, abutting ends of the pipe sections "P1" and "P2" to fusion temperature. These processes are described in further detail below.

Figure 2:
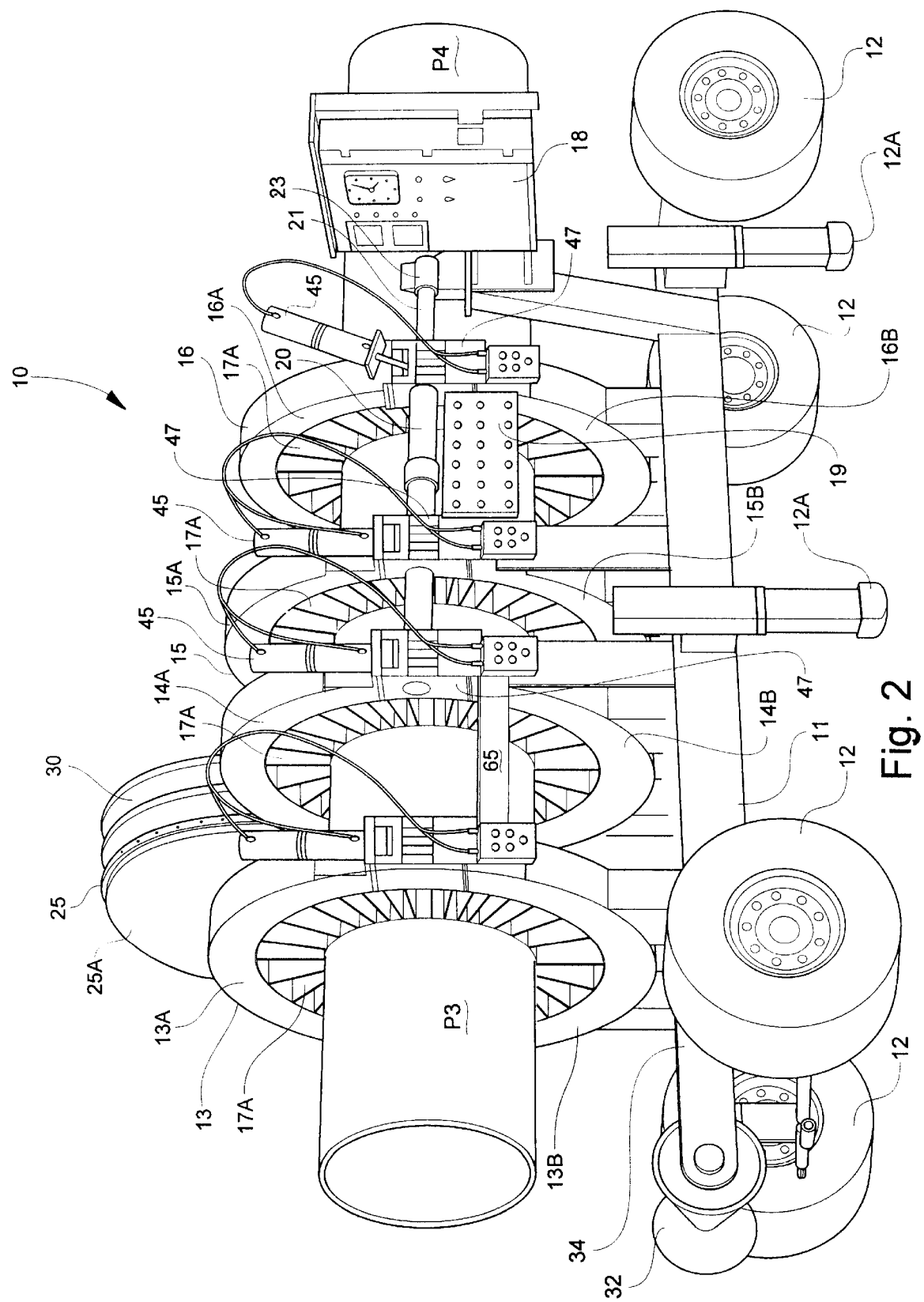
FIG. 2 is a perspective view of the butt fusion machine according to a preferred embodiment of the invention, modified with clamping jaw spacers to accommodate pipe of reduced diameter.

FIG. 2 illustrates the same butt fusion machine 10, with upper and lower spacers 17A and 17B installed in each of the jaws 13–16, inclusive. This permits smaller diameter pipe sections P3 and P4 to be butt fused as described in this application. Control panels 18 and 19 control and monitor all functions of the butt fusion machine 10.

Figure 3:
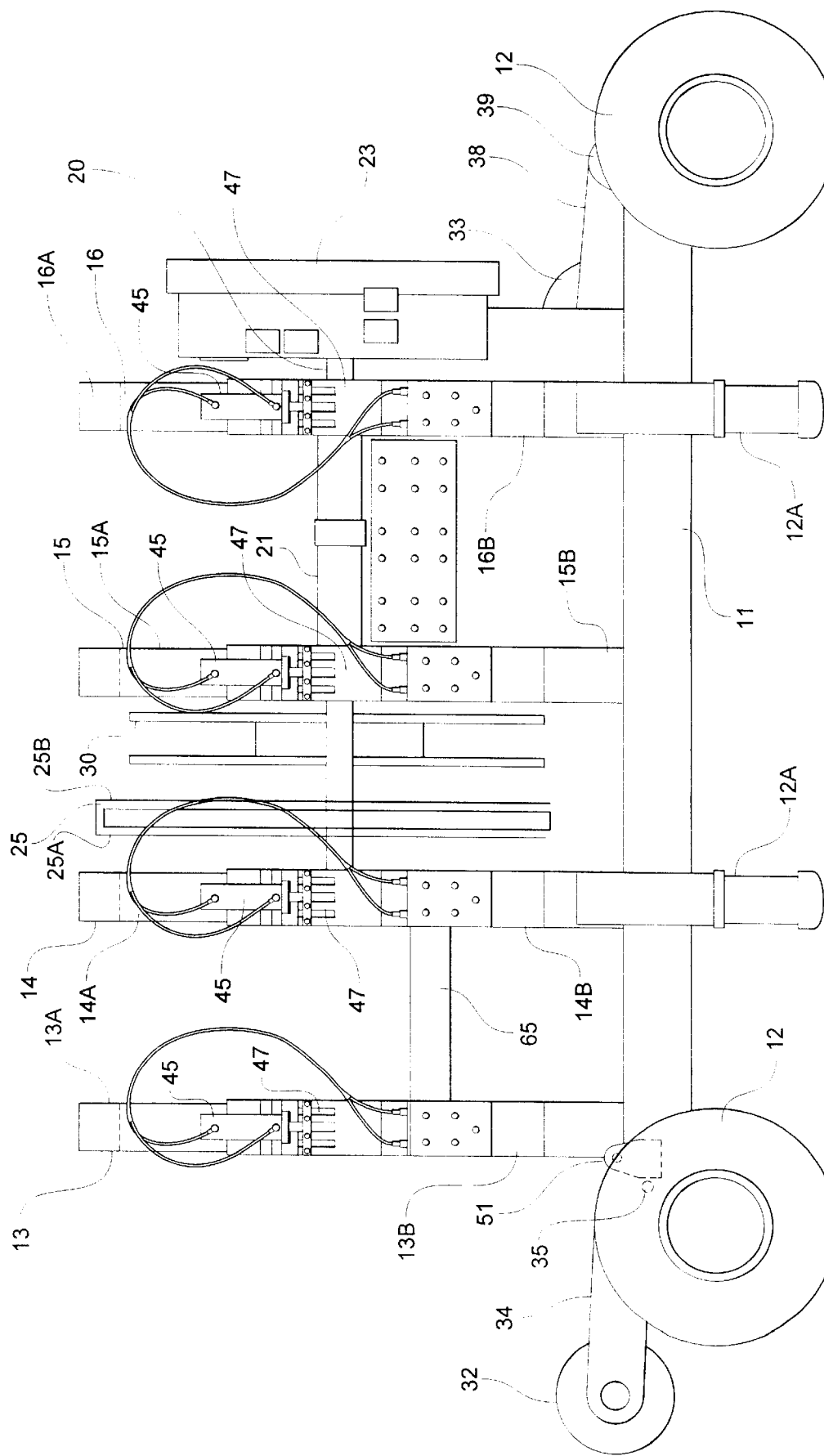
FIG. 3 is a simplified side elevation of the butt fusion machine according to FIG. 1.

As is best shown in FIG. 3, Pipe rollers 32 and 33 are carried by the frame 11 and assist in moving the two pipe sections "P1" and "P2" into and out of fusing position when the butt fusion machine 10 is being operated to butt fuse two straight pipes. Pipe roller 32 includes a pair of arms 34 mounted by pivot brackets 35 to frame 11 and is hydraulically-powered by a piston and cylinder assembly, not shown, to move upwardly and downwardly as needed to raise and lower the section of pipe "P1" being held in clamping jaws 13 and 14. Pipe roller 33 includes a pair of arms 38 mounted by pivot brackets 39 to frame 11 and is hydraulically-powered by a piston and cylinder assembly, not shown, to move upwardly and downwardly as needed to raise and lower the section of pipe being held in clamping jaws 15 and 16. Other types of pipe adjusting means can be used, as well.

Detailed Description of Clamping Jaws

Figure 4:
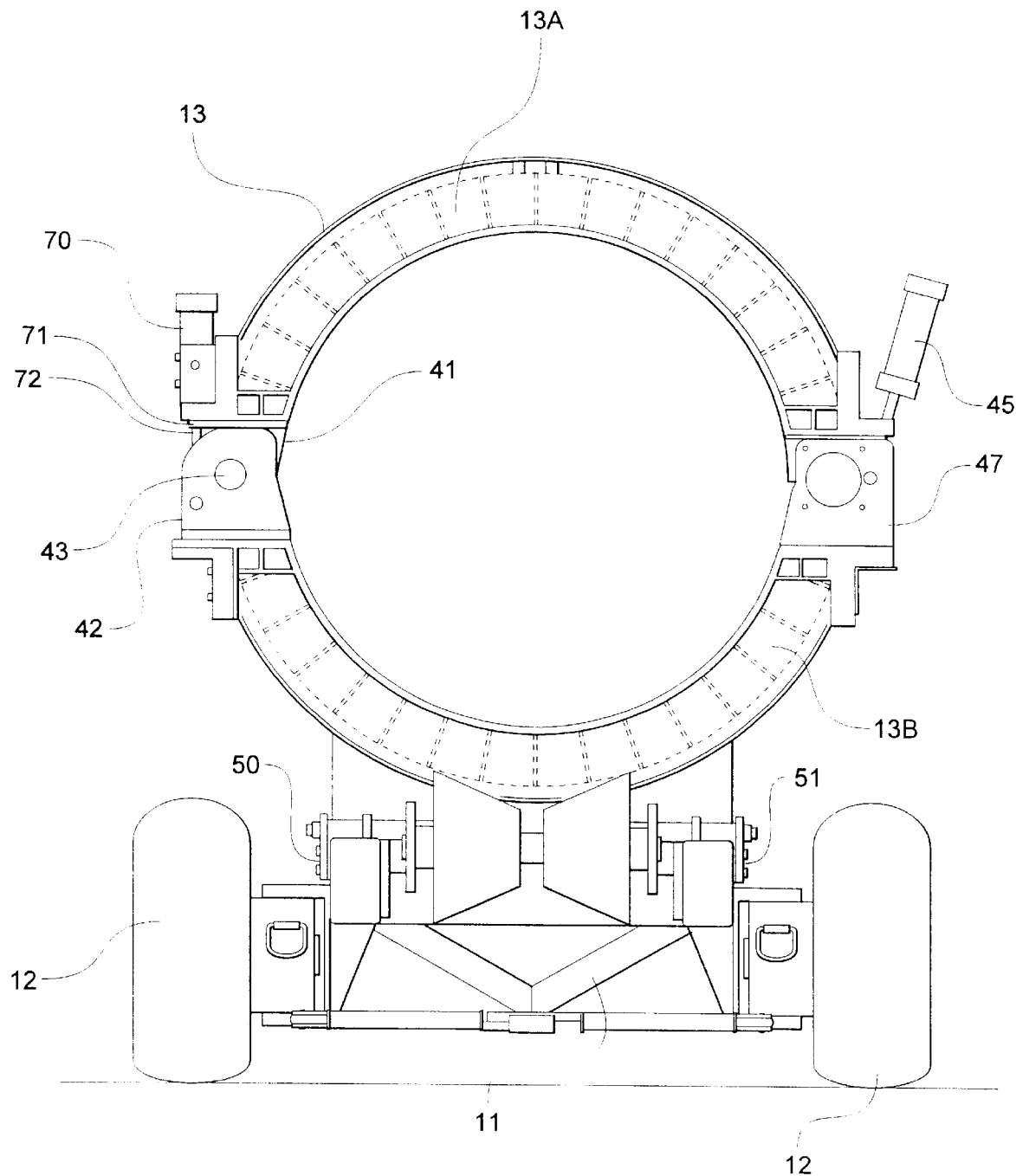
FIG. 4 is a front end elevation of the butt fusion machine of FIG. 1, with the pipe omitted for clarity.

Referring now to FIG. 4, upper and lower clamping jaw halves 13A, 13B are shown. Clamping jaws 14, 15 and 16 are constructed in the same manner, and the description of operation of the upper and lower jaw halves 13A, 13B which follows applies to jaw 14, 15, and 16, as well. As is shown, jaw 13 is mounted transverse to the longitudinal axis of the butt fusion machine 10. Upper jaw half 13A pivots about an axis defined on upper and lower hinges 41 and 42 about a pivot pin 43. Clamping takes place on the opposite side of the jaw 13, where a piston and cylinder assembly 45 attached to a clamping assembly 47 applies hydraulic clamping pressure to pipe section "P1" positioned in the jaw 13 through the rotational movement of the top clamp half 13A, as described in more detail below.

Jaw 13 is preferably pivoted on an axis perpendicular to the longitudinal axis of the pipe section "P1", so that it can be moved into a lowered position when a fitting, such as a "Tee" fitting is being joined to a pipe section "P2" being held by the jaws 15 and 16. As is shown in FIG. 4, laterally-spaced brackets 50 and 51 pivot to permit jaw 13 to rotate between the raised, vertical position shown in FIG. 4 and a lowered position with the jaw 13 in a horizontal position. When in its raised position, the jaw 13 is locked in an upright position by a beam 65 when extends horizontally between jaws 13 and 14.

The operation of this feature is explained in further detail in applicant's prior application Ser. No. 551,119.

Details of Clamping Jaws Geometry and Operation

Referring now to FIGS. 5–8, the details of the clamping jaws 13, 14, 15 and 16 are explained. The geometry of the jaw design is illustrated in FIGS. 9 and 10.

As noted above, the explanation of the jaw geometry and operation proceeds with reference to jaw 13, but applies as well to the other stationary jaw 14 and the movable jaws 15 and 16. Upper jaw half 13A is pivotally attached to lower jaw half 13B by a rotatable upper hinge 41 pivotally connected to a stationary lower hinge 42 carried on lower jaw half 13B. Pivotal connection is by a hinge pin 43 which extends through the hinges 41 and 42 and ties the upper and lower jaw halves 13A and 13B together, and about which the upper jaw half 13A pivots.

The pivotal center defined by the hinge pin 43 is on a common line formed by the geometric center of the circular jaw clamping surfaces of the upper and lower jaw halves 13A, 13B, and the center of rotation of the upper jaw half 13A in common with the horizontal centerline of the jaw 13.

Figure 5:
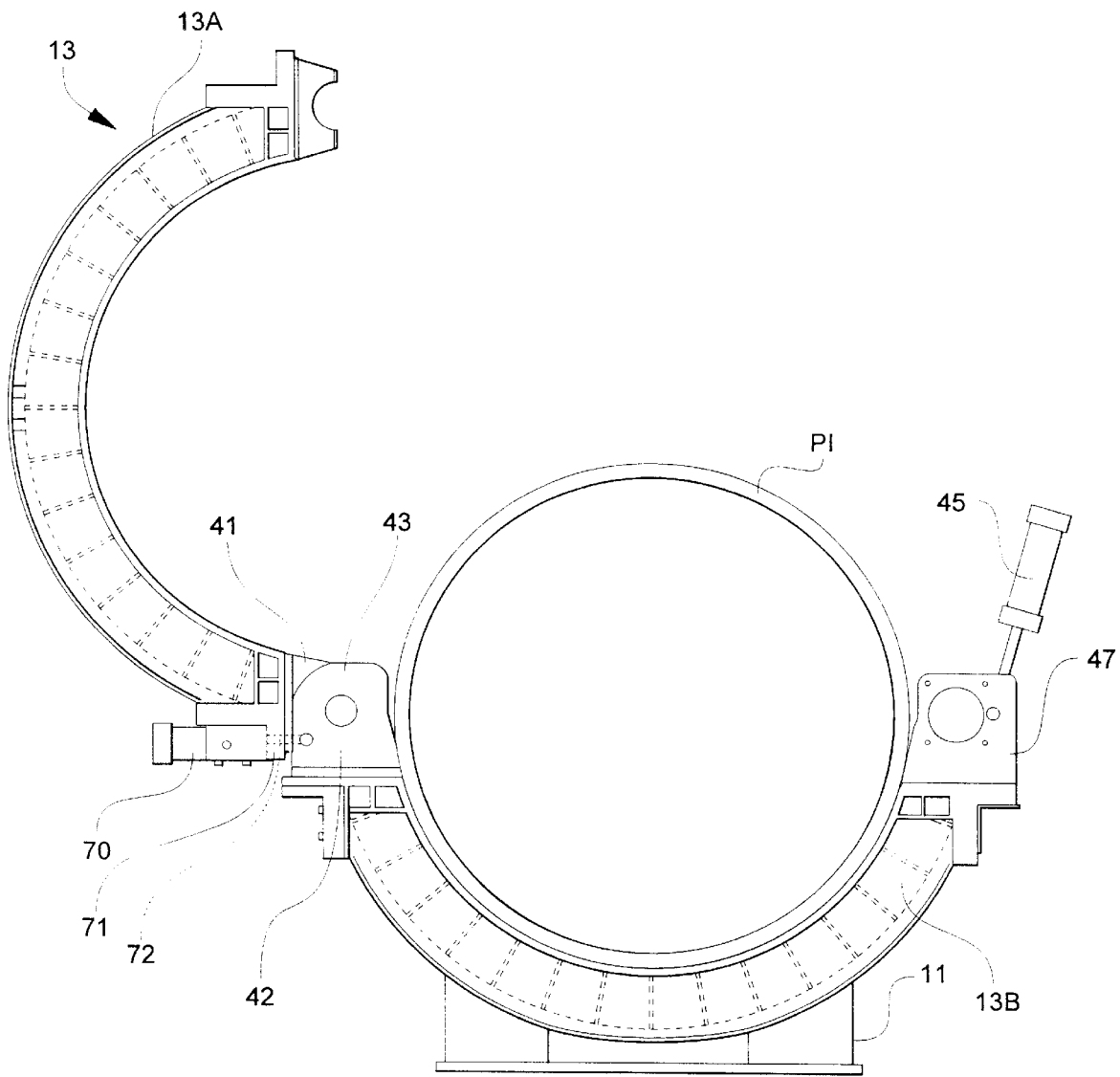
FIGS. 5, 6 and 7 are further simplified fragmentary front end elevations of the pivotable jaw assembly shown in FIGS. 1, 2, 3 and 4.
Figure 6:
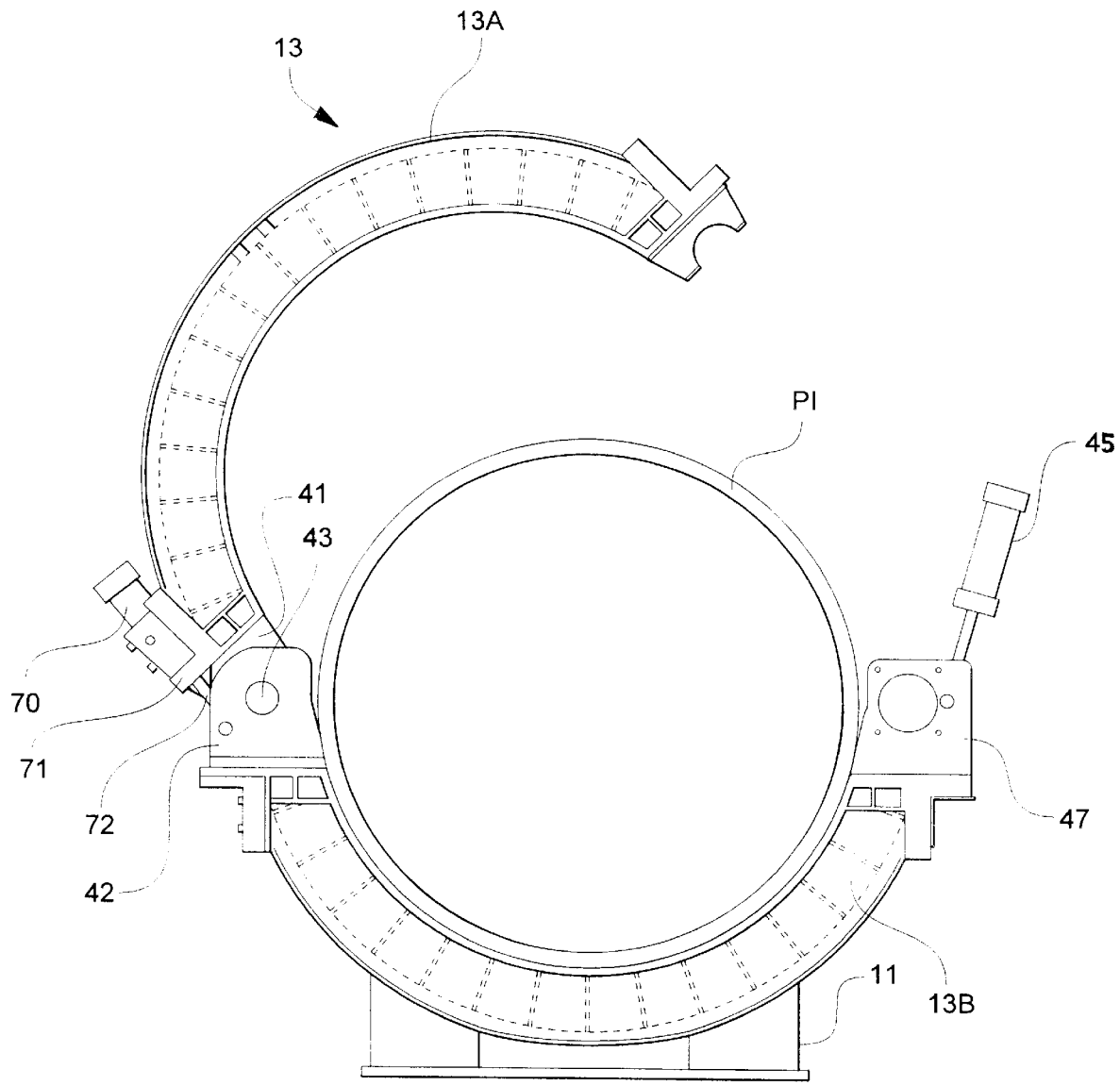
Figure 7:
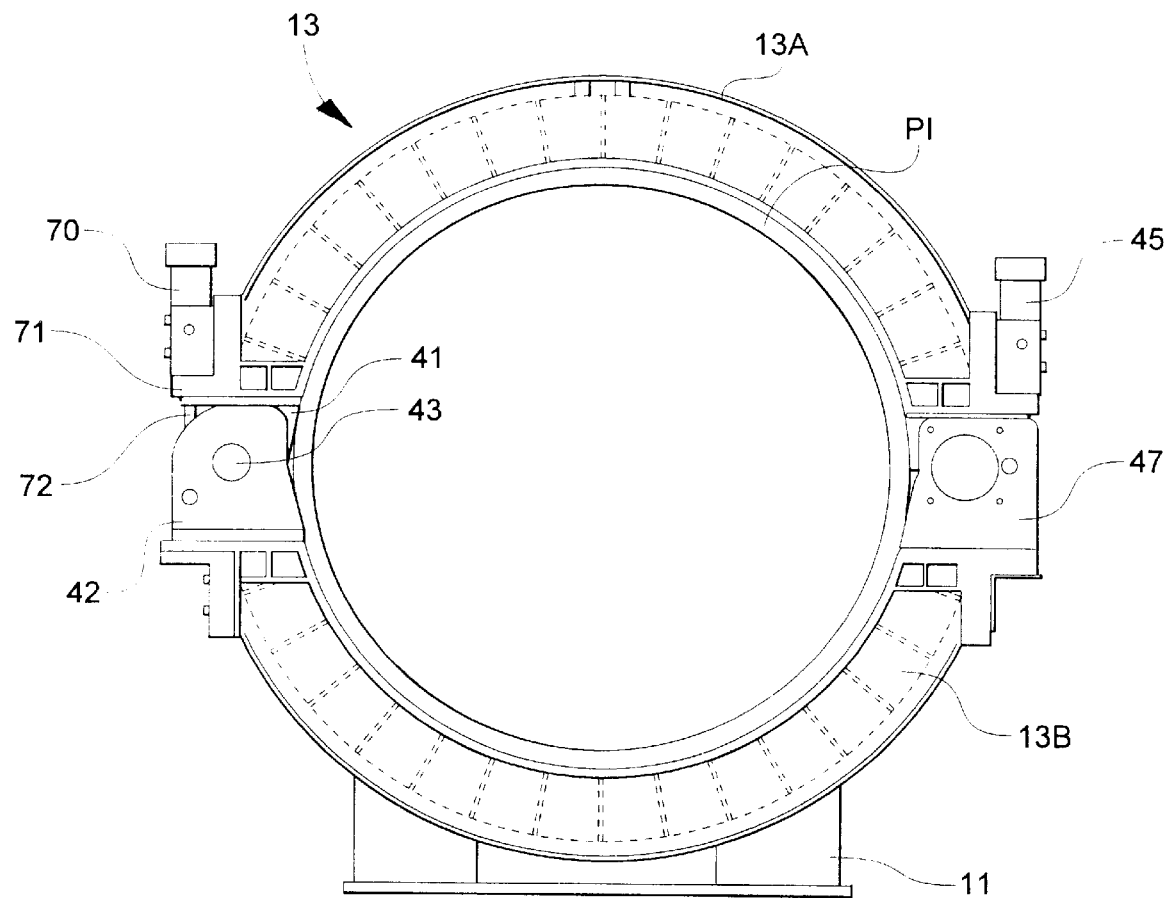

As is shown in FIGS. 4, 5 and 6, upper jaw 13A can therefore pivot through a range of motion wide enough so that large diameter pipe can be positioned in and cradled by the lower jaw 13B while the jaw 13A is open. The lower jaw 13B then cooperates with upper jaw 13A to clamp the pipe. Jaws 14, 15 and 16 pivot and clamp in the same manner as described above.

Figure 8:
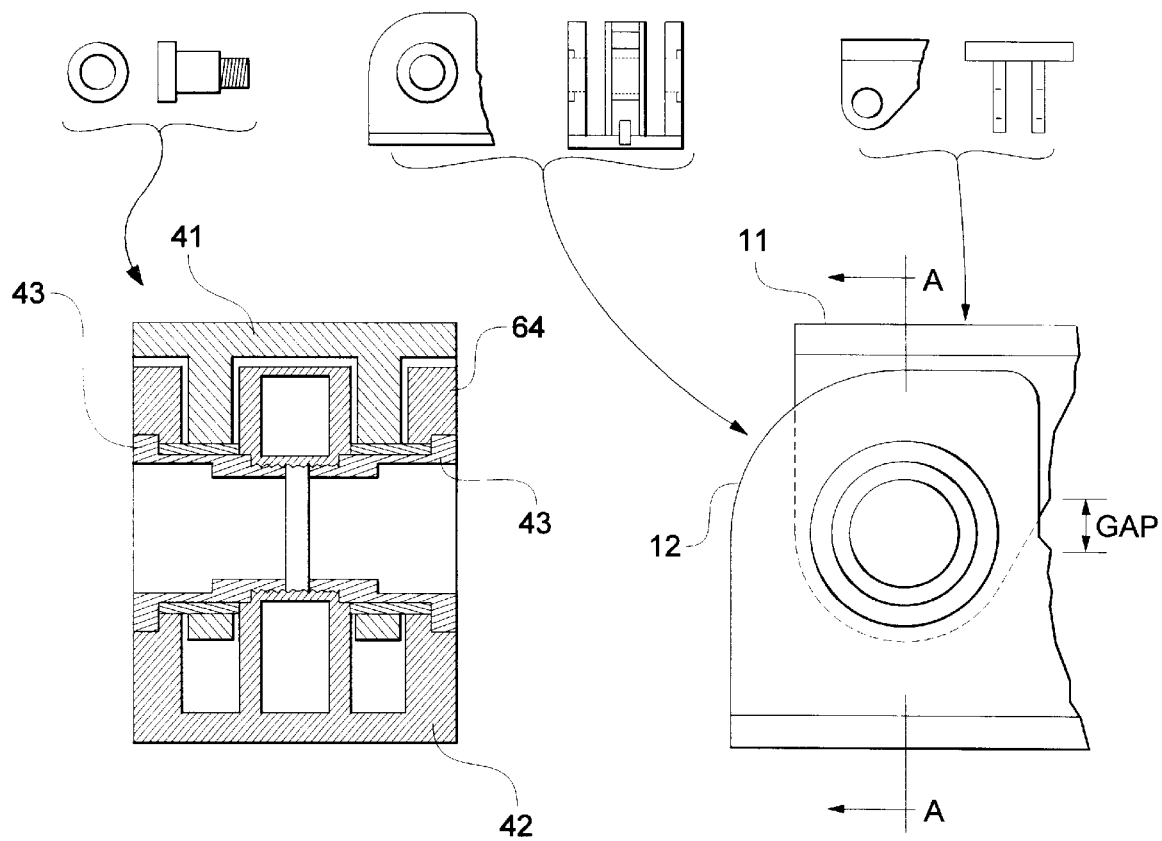
FIG. 8 is a cross-sectional view of the hinge assembly.

As is best shown in FIG. 8, the hinge pin 43 is split into two identical halves. Suitable ones of these hinge pins 43 have a hollow core 64 through which the guide rod 21 can be extended for insertion into the respective hinges of jaws 14, 15 and 16. Guide rod 21 therefore cooperates with the hinge pins of the jaws to mount the jaws 14, 15 and 16 on a single coincident pivot axis with jaw 13, and to define a translation axis of the movable jaws 15 and 16 which is coincident with the pivot axis of the jaws. The location of the hinge pin 43 allows a much smaller gap on the hinge side of the jaws between the upper hinge 41 and the lower hinge 42 between the upper and lower jaws 13A and 13B in the closed position. This smaller gap minimizes the extrusion of the pipe into any open space between the upper and lower jaws 13A and 13B and increases the amount of the pipe circumference physically engaged by the jaws 13A and 13B, thus producing a more rounded finished fusion joint.

Each of the jaws 13, 14, 15 and 16 are opened and closed by respective hydraulic cylinders. As is best illustrated by way of example in FIGS. 5, 6 and 7, a hydraulic cylinder 70 is mounted on a mounting bracket 71 on the end of jaw 13A adjacent hinge 41. A piston rod 72 controlled by hydraulic cylinder 70 is pivotally pinned to hinge 42. As is seen by comparing the position of the hydraulic cylinder 70 and the piston rod 72 in FIGS. 5, 6 and 7, jaw 13A is closed by extending the piston rod 72, thereby moving jaw 13A in the clockwise direction. Conversely, jaw 13 is opened by retracting the piston rod 72, thereby moving the piston rod 72 in the counterclockwise direction. Each of the jaws 13, 14, 15 and 16 function in the same manner.

As noted above, when jaw 13 is closed, piston and cylinder assembly 45 attached to clamping assembly 47 applies hydraulic clamping pressure to pipe section "P1" positioned in the jaw 13. Compare FIGS. 4 and 7.

Referring now to FIGS. 9 and 10, the geometry of the clamping jaws is explained. As noted above, the explanation is with regard to jaw 13, but equally applicable to jaws 14, 15 and 16, as well.

Figure 9A:
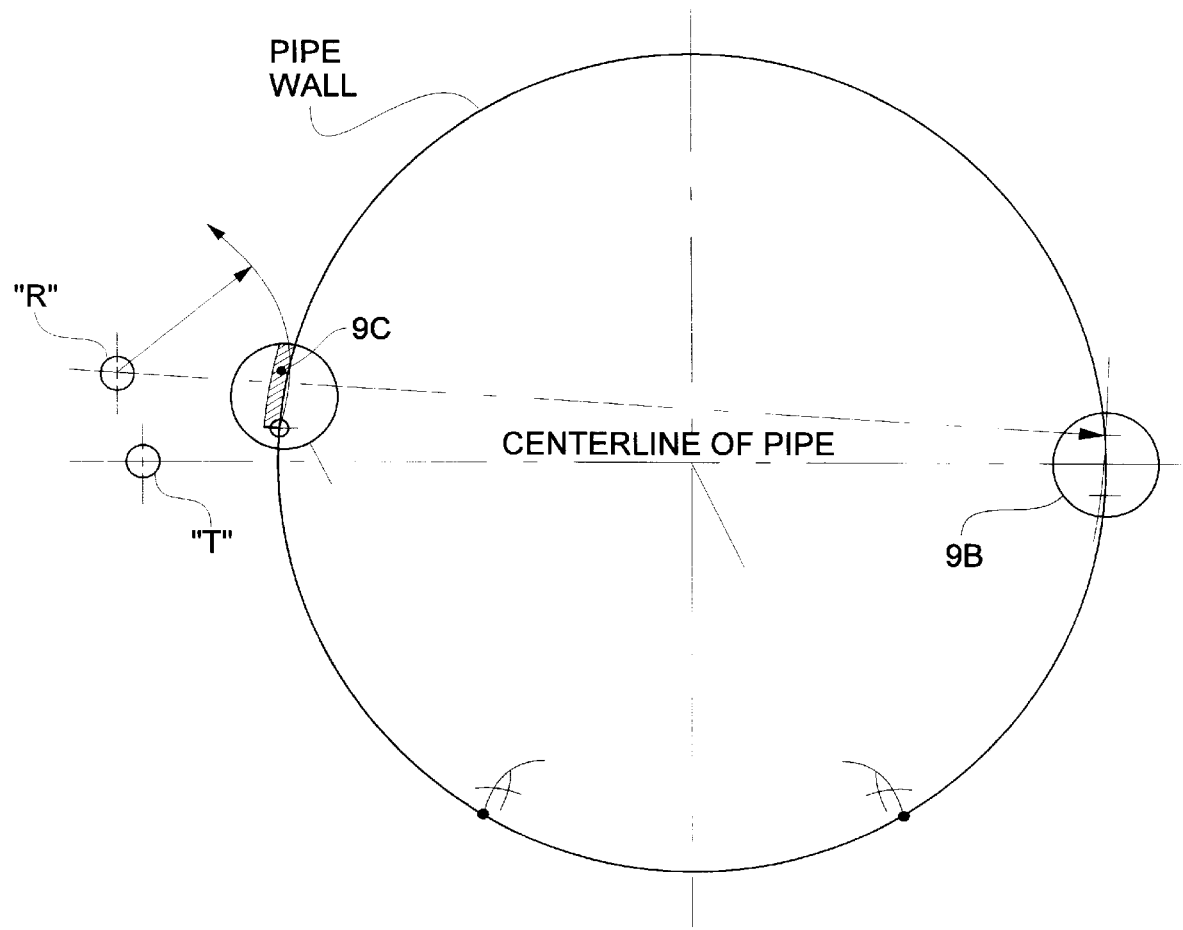
FIGS. 9A, 9B and 9C are diagrammatic illustrations of the geometry of a prior art jaw pivot assembly.
Figure 9B:
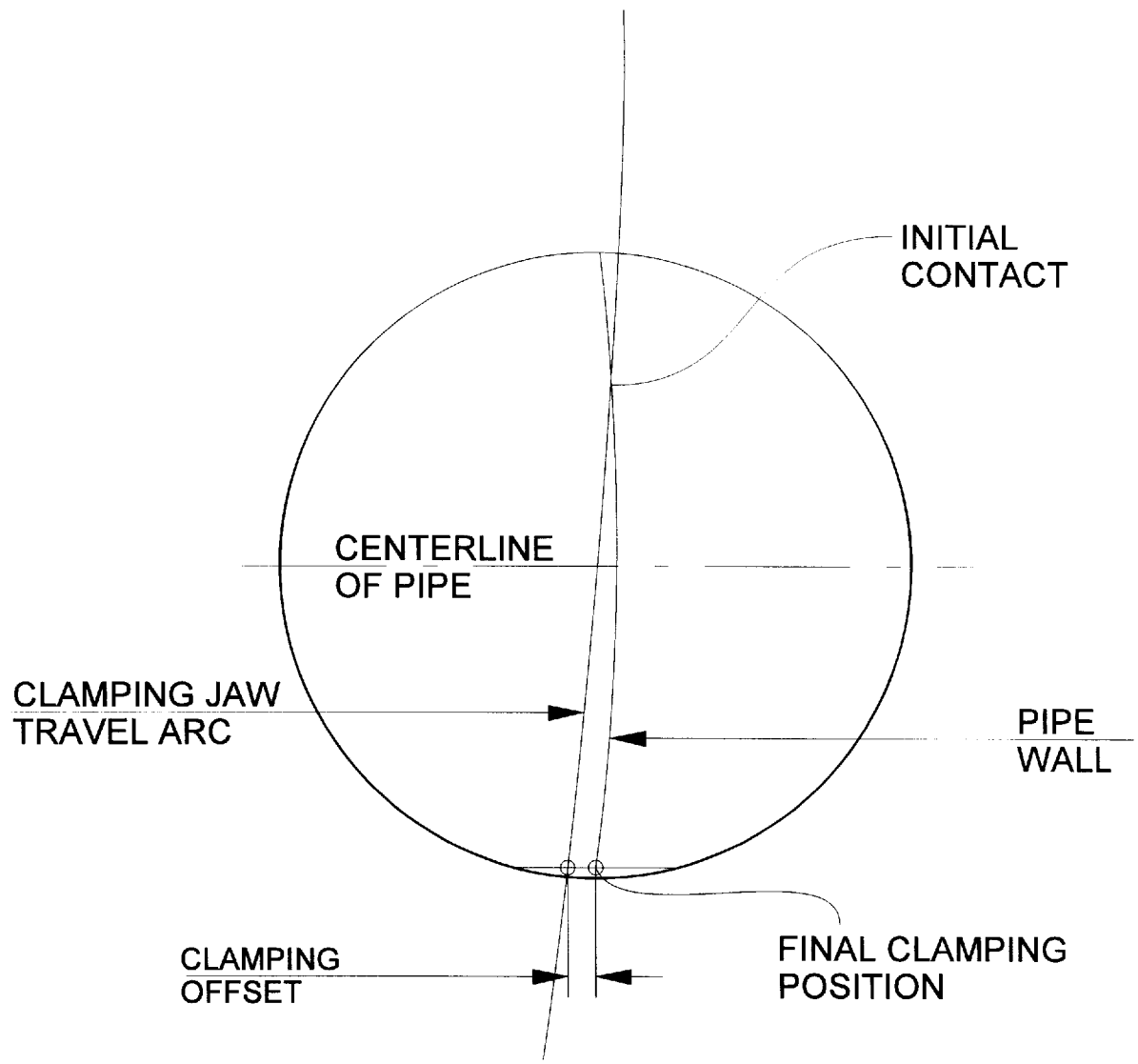
Figure 9C:
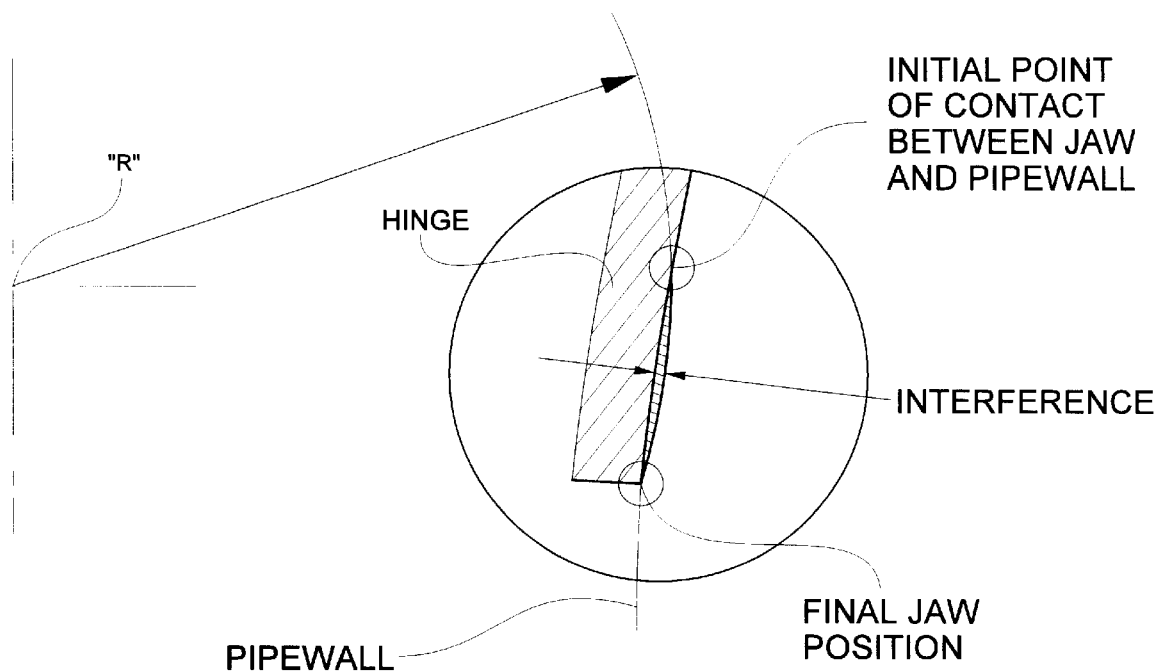

FIGS. 9A–9C illustrate a typical jaw clamping arrangement of a prior art butt fusion machine. FIG. 9A illustrates that in prior art machines the rotating center of the jaw hinge "R" is both vertically and horizontally offset from the translating center "T" along which the movable jaws translate to and from each other and the fixed jaws. This offset results in a jaw closure arc which causes interference between the jaw and the pipe on the hinge side of the jaw and on the opposite side of the pipe. FIG. 9B (a detail of inset 9B in FIG. 9A) illustrates the jaw interference on the side of the pipe opposite the hinge. Initial contact between the upper jaw half and the pipe wall occurs well before the centerline, i.e. the furthest distance from the jaw hinge, of the pipe is reached. Beyond this point the jaw must deflect the pipe wall sufficiently to continue its travel to the final clamping position. Note in FIG. 9B that the final clamping position of the upper jaw half is "inside" the nominal pipe wall plane, thus indicating that to reach its final clamping position the upper jaw half has deflected the pipe wall to the degree noted at "Clamping Offset", and that this offset is maintained throughout the fusion process. This offset introduces a degree of asymmetry to the process with has the potential to cause a weakened or otherwise defective fusion joint.

Note also FIG. 9C (a detail of inset 9C in FIG. 9A), which indicates that as the hinge rotates clockwise into clamping position it makes an initial point of contact above the centerline of the pipe and deflects the wall of the pipe inwardly as its continues it downward travel. The interference on the hinge side of the pipe causes a deflection or offset, shown in shaded area. Typically, this problem is minimized by increasing the hinge side gap. A large gap allows the clamped pipe to extrude into this spacing, which further reduces the "roundness" of the pipe and thus creates further potential for misalignment of the joint.

Figure 10A:
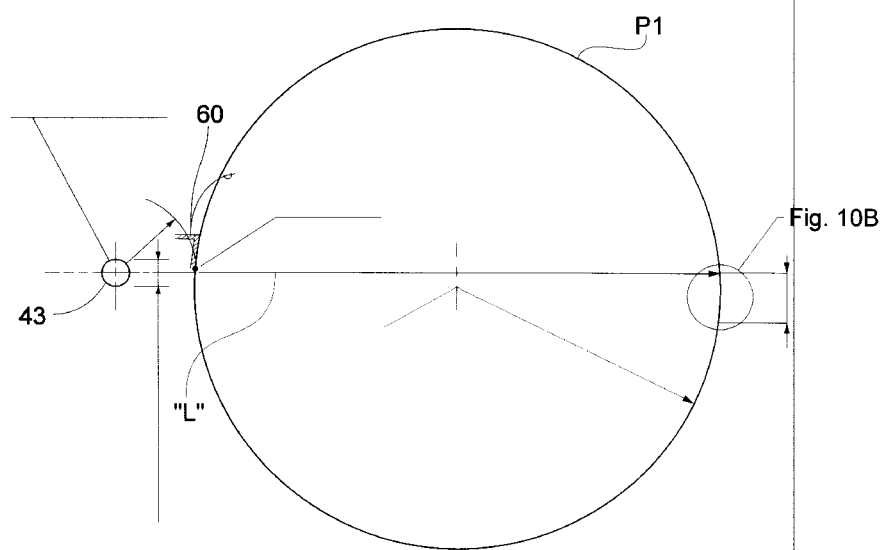
Figures 10A and 10B are diagrammatic illustrations of the geometry of the clamping jaw pivot assembly according to an embodiment of the invention.
Figure 10B:
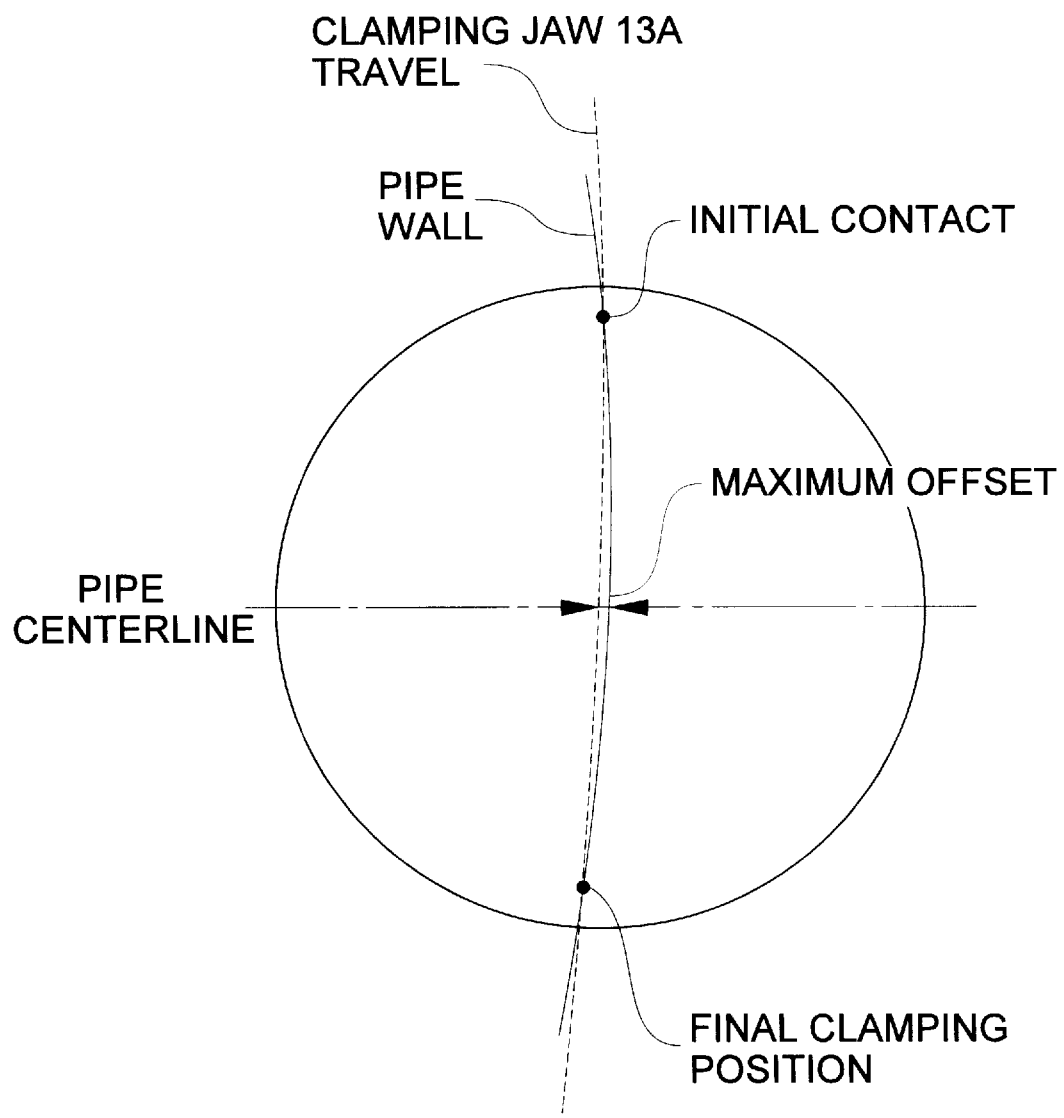

In contrast, note the geometry of the butt fusion machine 10 shown diagrammatically in FIGS. 10A–B. The rotating center of hinge pin 43 is optimally aligned with the horizontal centerline of the pipe "P1". This is best explained by defining a notional line "L" extending through the pivot axis of the upper jaw halves, the coincident translation axis of the jaws, and the pipe sections, as shown in FIG. 10A. As used and defined in this application this notional line "L" is considered to be in alignment if it deviates from the centerline of the pipe sections by a distance equal to 5% or less of the diameter of the pipe. For example, using butt fusion machine 10 to fuse 60 inch pipe, the relationship between the pivot axis of the upper jaw halves, the coincident translation axis of the jaws and the centerline of the pipe are in alignment if the notional line extending through the pivot axis of the upper jaw halves and the translation axis of the jaws, and deviates from the centerline of the pipe by no more than +/−3 inches. However, within this range optimum pipe fusion results can be obtained by adhering to a deviation of no more than 5% or less of the diameter of the pipe.

As is shown in FIG. 10B, the travel of the upper jaw half 31A makes initial contact with the pipe wall just prior to intersecting the pipe centerline. The final clamping position is generally symmetrical with the point of initial contact. The maximum offset at the point of the pipe center line is minimal and disappears at the final clamping position.

Operation of Butt Fusion Machine

Referring again to FIG. 1, butt fusion machine 10 is shown in the position in which sections of straight pipe "P1" and "P2" are butt fused together. Pipe section "P2" is inserted into the movable jaws 15 and 16 when the upper jaw halves 15A and 16A are pivoted away from the lower jaw halves 15B and 16b. The roller 33 may be used to move the pipe into the jaws 15 and 16, and to lift the pipe to the proper height. After the pipe section "P2" is properly positioned, the upper jaw halves 15A, 16B are closed and hydraulically locked into place through the action of the cylinder assemblies 45.

Pipe section "P1" is inserted into the stationary jaws 13 and 14 when the upper jaw halves 13A and 14A are pivoted away from the lower jaw halves 13B and 14b. The roller 32 may be used to move the pipe into or out of the jaws 13 and 14, and to lift the pipe to the proper height. After the pipe section "P1" is properly positioned, the upper jaw halves 13A, 14A are closed and mechanically locked into place around the pipe "P1" by the hydraulic cylinder assemblies 45 so that the pipe is immovably held.

Fine adjustments are made to place both pipe sections in exact axial alignment with each other and at an exact distance from each other. After alignment of the pipes are completed, the facing tool 30 is pivoted into the space between the pipes and rotated to properly face the pipes to provide a flat, properly aligned face on the pipe surfaces to be butt fused.

After facing with the facing tool 30 takes place, the pipe "P2" in the movable jaws 15 and 16 is repositioned and the heating assembly 25 is pivoted into the space between the pipes and the edges of the pipe are heated to the proper temperature. When proper temperature has been reached, the heating assembly 25 is pivoted out of the space between the pipes, and the pipe "P2" in the movable jaws 15 and 16 is shifted axially forward towards the stationary pipe "P1" in jaws 13 and 14. When the adjacent edges of the pipes meet, the melted plastic merges, and forms a completely integrated, unitary mass and a uniform circumferential fusion bead forms on both sides of the joint. This position is held until the plastic has cooled and hardened. The jaws 13–16 are opened by rotating the upper jaw halves 13A–16A out of engagement with the pipe, and the butt fusion machine 10 is driven forward along the pipeline run to a point forward of the joint in preparation for the next section of pipe.

A butt fusion apparatus butt fusion apparatus with clamping jaws for clamping pipe to be fused without interference between the clamps and the pipe is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In an apparatus for attaching abutting ends of first and second coaxial pipes sections together, and including a support frame, a fixed pipe clamping jaw having upper and lower jaw halves carried by the support frame for positioning the first pipe section in a fixed position, a movable pipe clamping jaw having upper and lower jaw halves carried by the support frame for translating movement of the second pipe section relative to the fixed clamping jaw and into aligned abutment with the first pipe section, and joining means for joining the first and second abutted pipe sections together;

the improvement comprising clamping jaw pivot means for pivoting said respective fixed and movable upper and lower jaw halves into and out of clamping engagement with said first and second coaxial pipe sections, wherein:

(a) said jaw pivot means comprises:

(i) a fixed jaw pivot pin defining a pivot axis of the upper jaw half of the fixed clamping jaw;

(ii) a movable jaw pivot pin defining a pivot axis of the upper jaw half of the movable clamping jaw;

(iii) wherein the pivot axis of the movable jaw pivot pin and the pivot axis of the fixed pivot pin are coincident with each other; and (b) jaw mounting means comprising a longitudinally extending support for mounting said movable jaw and said fixed jaw for translating movement towards and away from each other, wherein said support defines a translation axis which extends along a longitudinal centerline of said support coincident with the pivot axis of the fixed upper jaw half and the movable upper jaw half.

2. In an apparatus for attaching abutting ends of first and second coaxial pipe sections together, and including a support frame, at least two spaced-part fixed pipe clamping jaws having respective upper and lower jaw halves carried by the support frame for positioning the first pipe section in a fixed position, at least two movable pipe clamping jaws having respective upper and lower jaw halves carried by said support frame for translating movement of the second pipe section relative to said fixed clamping jaws and into aligned abutment with said first pipe section, and joining means for joining the first and second abutted pipe sections together;

the improvement comprising clamping jaw pivot means for pivoting said respective fixed and movable upper and lower jaw halves into and out of clamping engagement with said first and second coaxial pipe sections, wherein:

(a) said jaw pivot means comprises:

(i) respective fixed jaw pivot pins defining a pivot axis of the upper jaw half of each of the at least two fixed clamping jaws;

(ii) respective movable jaw pivot pins defining a pivot axis of the upper jaw half of each of the at least two movable clamping jaws;

(iii) wherein the pivot axes of the movable jaw pivot pins and the pivot axes of the fixed pivot pins are coincident with each other; and (b) jaw mounting means comprising a longitudinally extending support for mounting said movable jaws and said fixed jaws for translating movement towards and away from each other, wherein said support defines a translation axis which extends along a longitudinal centerline of said support coincident with the pivot axis of each of the fixed upper jaw halves and the movable upper jaw halves.

3. In an apparatus according to claim 1 or 2, wherein a notional line extending through the pivot axis of the upper jaw halves, the translation axis of the jaw and the pipe sections deviates from the horizontal centerline of the pipe sections by a distance equal to 5% or less of the diameter of the pipe.

4. In an apparatus for attaching abutting ends of first and second coaxial pipe sections together, and including a support frame, at least one spaced-part fixed pipe clamping jaw having an upper jaw half carried by the support frame for positioning the first pipe section in a fixed position, at least one movable pipe clamping jaws having an upper and lower jaw half carried by said support frame for translating movement of the second pipe section relative to said fixed clamping jaw and into aligned abutment with said first pipe section, and joining means for joining the first and second abutted pipe sections together;

the improvement comprising clamping jaw pivot means for pivoting said respective fixed and movable upper and lower jaw halves into and out of clamping engagement with said first and second coaxial pipe sections, wherein:

(a) said jaw pivot means comprises:
  (i) a fixed jaw pivot pin defining a pivot axis of the upper jaw half of the at least one fixed clamping jaw;
  (ii) a movable jaw pivot pin defining a pivot axis of the upper jaw half of the at least one movable clamping jaw;
  (iii) wherein the pivot axis of the movable jaw pivot pin and the pivot axis of the fixed pivot pin are coincident with each other; and
(b) jaw mounting means comprising a longitudinally extending support for mounting said at least one movable jaw and said at least one fixed jaw for translating movement towards and away from each other, wherein said support defines a translation axis which extends along a longitudinal centerline of said support coincident with the pivot axis of each of the at least one fixed upper jaw half and the at least one movable upper jaw half.

5. In an apparatus according to claim 4, wherein a notional line extending through the pivot axis of the at least one upper jaw half, the translation axis of the at least one upper and lower jaws and the pipe sections deviates from the horizontal centerline of the pipe sections by a distance equal to 5% or less of the diameter of the pipe.

* * * * *